(12) United States Patent
Eckert et al.

(10) Patent No.: US 8,040,794 B2
(45) Date of Patent: Oct. 18, 2011

(54) SERVER TO NETWORK SIGNALING METHOD FOR RAPID SWITCHING BETWEEN ANYCAST MULTICAST SOURCES

(75) Inventors: Toerless T. Eckert, Mountain View, CA (US); John Meylor, Auburn, CA (US); Gary B. Williamson, Richardson, TX (US); Steve Simlo, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 11/107,573

(22) Filed: Apr. 15, 2005

(65) Prior Publication Data

US 2006/0233154 A1    Oct. 19, 2006

(51) Int. Cl.
*G06F 11/00* (2006.01)
(52) U.S. Cl. .................. 370/219; 709/231
(58) Field of Classification Search .............. 370/225, 370/216, 230, 237, 229, 219; 709/231
See application file for complete search history.

(56) References Cited

U.S. PATENT DOCUMENTS

| | | | | |
|---|---|---|---|---|
| 5,774,668 A * | 6/1998 | Choquier et al. | ............ | 709/223 |
| 6,647,389 B1 * | 11/2003 | Fitch et al. | ............ | 1/1 |
| 6,982,951 B2 * | 1/2006 | Doverspike et al. | ......... | 370/217 |
| 7,133,365 B2 * | 11/2006 | Klinker et al. | ............ | 370/238 |
| 7,297,858 B2 * | 11/2007 | Paepcke | ............ | 84/609 |
| 7,403,524 B2 * | 7/2008 | Hill | ............ | 370/392 |
| 2004/0022278 A1 * | 2/2004 | Thomas et al. | ............ | 370/537 |
| 2004/0107234 A1 * | 6/2004 | Rajahalme | ............ | 709/200 |

OTHER PUBLICATIONS

Malkin, G., "RFC 2453—RIP Version 2" online, Nov. 1998, Bay Networks, [retrieved on Feb. 22, 2005]. Retrieved from the Internet: <URL:http://www.faqs.org/rfcs/rfc2453.html>.

* cited by examiner

*Primary Examiner* — Ricky Ngo
*Assistant Examiner* — Chandrahas Patel
(74) *Attorney, Agent, or Firm* — Tucker Ellis & West LLP (57) ABSTRACT

The subject application is directed to a system and method for rapid switching between anycast multicast sources. Multiple streams of data are received by a server. The server associates a separate source address to each of the received streams and sources the multiple streams of data with the associated addresses to a recipient. The server determines whether each of the multiple streams of data is up or down. The server periodically sends status information with the associated address for each of the multiple streams of data to the recipient indicating whether each of the multiple streams of data is up or down.

32 Claims, 7 Drawing Sheets

Fig. 3(b)
Server Periodically Sends Status of Streams

Fig. 4
Example Status Packet Format

Fig. 5

SERVER TO NETWORK SIGNALING METHOD FOR RAPID SWITCHING BETWEEN ANYCAST MULTICAST SOURCES

BACKGROUND OF THE INVENTION

1. Field of the Invention

The present invention relates to networking and, more specifically, to a method and system for reliably transmitting IPmc streams of data over a network.

2. Description of the Background Art

While the concept of anycasting is well known, it is most often applied to services where unicast traffic is sent towards an anycast address as a form of redundancy for a service. When IP (Internet Protocol) multicast is used, it is also feasible to source IP multicast traffic from an anycast address to provide server redundancy. Current implementations have some limitations. For example, assume that two or more servers at separate physical locations in a network source the same content. Both servers are assigned the same IP address. A local router for each of the servers is configured to advertise this address to the network as a host route so that clients in the network will connect to the nearest anycast server. One use of anycast servers is to source video data. Anycast multicast video servers in video networks provide both load balancing and redundancy. For example, some video servers receive multiple MPEG ASI video streams that are packetized into separate multicast streams. The servers then send the data as multicast to a destination by way of network routers.

Sometimes, a server will not transmit one or more of its data streams due to loss of input signal to the server. In conventional systems, if only a single data stream from a server goes down (e.g., an MPEG video stream) while all other streams from the server remain up, there is no way to restore the lost single stream, short of manually switching to another server that has all streams up. In this situation, the physical connection between the anycast server and the router has not gone down. The router is sending some legitimate streams of data; it is just not sending all of its streams. Conventional systems determine that a server is unavailable and not sending by looking at the physical interface between the server and the router. Unfortunately, because the physical interface between the anycast server and the router has not gone down, the router will not be able to detect a loss of physical connection and withdraw the host route from the network.

Sometimes a physical connection between a server and a router goes down. If the router connects to the server through switch interfaces, the router will be unaware that the physical link from the server to the switch has gone down. The actual application on the server appliance generating one or more video streams may be incapable of generating a link up/down signaling on its interface.

What is needed is some way for the routers to determine when some but not all streams from a server have gone down so that the router can withdraw the associated anycast host route from the network and force the network to switch to a remaining anycast source in the network.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION OF PREFERRED EMBODIMENTS

Described embodiments of the present invention use a simplified signaling mechanism in the anycast server (and/or a management station) to signal the status of the individual multicast source streams. The anycast server periodically sends status information advertising a host route for each source stream that the server is "actively" sourcing. A preferred embodiment of the invention uses the Routing Information Protocol (RIP) to advertise host routes for each multicast source although other routing protocols could be used. A recipient joins a multicast stream using known methods, causing Join messages to be sent towards the nearest source following the path described by IGP routing information. This causes the stream from the nearest appropriate server to be routed to that recipient. For example, if an anycast video server is sourcing twenty-four flows as source IP addresses S1-S24 to one or more multicast groups, the server would construct status information with twenty-four host routes, S1/32 through S24/32 with the first metric for each stream. The router is configured to redistribute these host advertisements into a rapid converging IGP (Internet Gateway Protocol) routing protocol (e.g. OSPF, EIGRP or ISIS) being used in the network.

If the anycast server detects the loss of any of its data streams (e.g., loss of MPEG video in the case of a video anycast server), it immediately triggers new status information that withdraws the previously advertised host route. In the preferred embodiment of the invention using the Routing Information Protocol (RIP), the host route associated with the affected source address is withdrawn by advertising the source address with a RIP metric of "infinity" (16 hops). This results in the router withdrawing this host route from the IGP causing the network to converge to the remaining anycast server(s) in the network.

It is also possible for a third-party network management station to perform the signaling based on other out of band telemetry between the server and the network management station. This method is capable of being applied not only to an "anycast" announcement, where all announcements have the same priority, but also by simply using different prefix-length to a priority-based announcement scheme.

Figure 1:
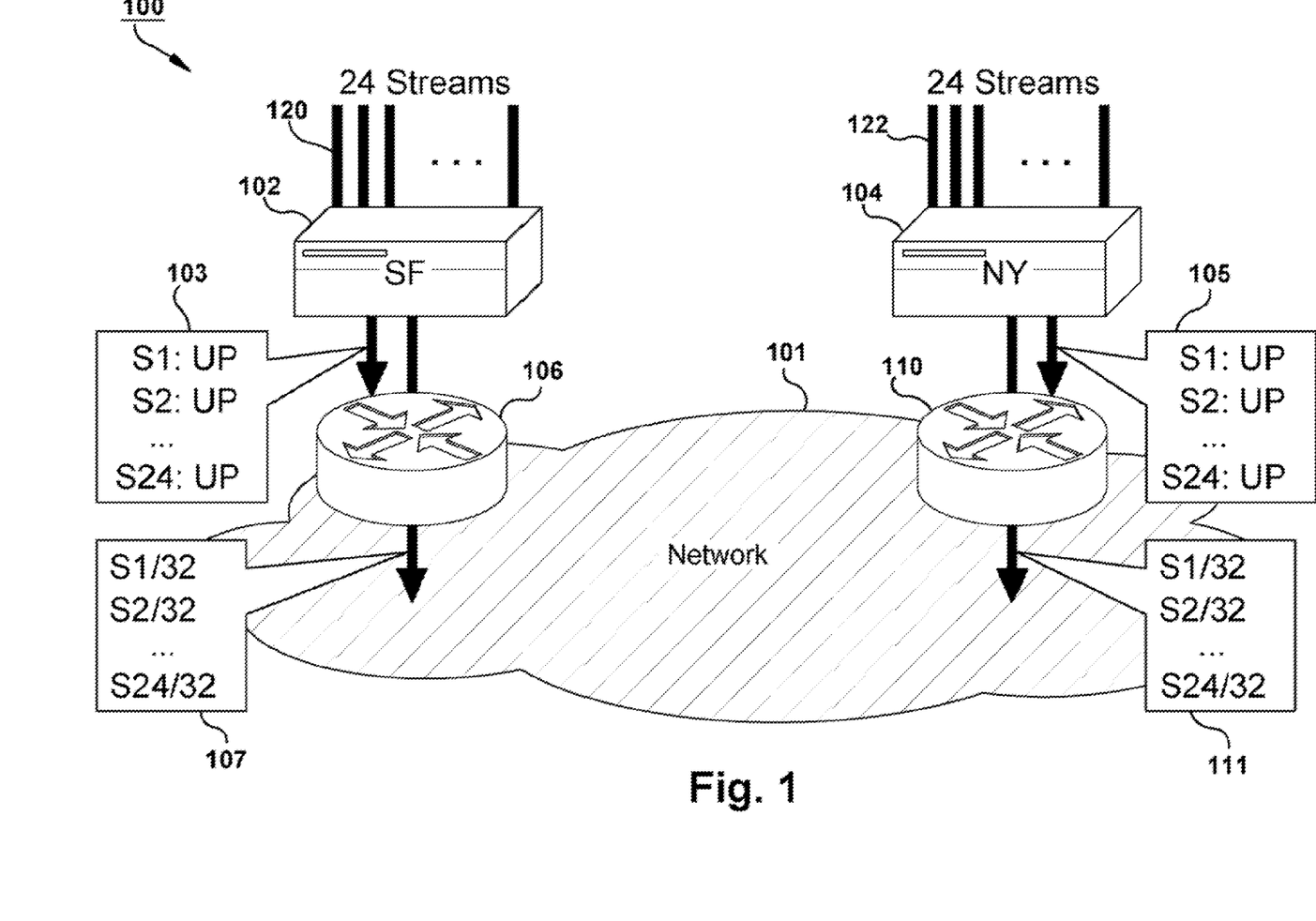
FIG. 1 is a block diagram in accordance with a preferred embodiment of the present invention when no streams are down.

FIG. 1 is a block diagram 100 in accordance with a preferred embodiment of the present invention when no streams are down. FIG. 1 shows a first server 102 (in this example, located in San Francisco, SF). Server 102 receives multiple data streams 120 (e.g., twenty-four data streams) and sends the streams in packetized form to a router 106 via a network 101. Router 106 routes the packets to an ultimate destination via network 101. Server 102 further transmits status information 103, showing whether each of the streams 120 is up. FIG. 1 also shows a second server 104 (in this example, located in New York, N.Y.). Server 104 receives twenty-four data streams 122 and sends the streams in packetized form to a router 110 via a network 101, such as the Internet, an intranet, or an extranet. The network can transmit packets via a wired or wireless connection. Server 104 further transmits status information 105, showing whether each of the streams 122 is up.

Router 106 transmits routing information 107, as is known in the art to indicate that router 106 is on the routes to server 102 to obtain each of streams 120. In the example, all streams are up and router 106 transmits routing information 107 for each of streams 120. Router 110 transmits routing information 111, as is known in the art to indicate that router 110 is on the routes to server 104 to obtain each of streams 122. In the example, all streams are up and router 110 transmits routing information 111 for each of streams 122.

As is understood by persons of ordinary skill in the art, in a preferred embodiment, new potential receivers of streams are connected to the source stream by the use of a PIM (Protocol Independent Multicast) protocol, and existing IGP routing information in the routers, to send PIM Join messages towards a source to establish a flow of data to the receivers.

The system of FIG. 1 can be implemented as redundant data sources (e.g., redundant heads ends of a video cable system). In a described embodiment, multiple head ends source a stream. For example, two head ends might source a particular stream. Thus, if one head end goes off the air, then the other head end will continue sourcing the stream. The receivers will be connected to the nearest source via PIM Join messages which follow the path to the source based on the routing metrics (such as IGP metrics) in the network.

Alternately, the servers might each serve a different geographical area when both servers are up, with one server beginning to source a stream for all recipients if that stream goes down on the other server. In other embodiments, servers 102 and 104 are co-located instead of being geographically dispersed. In some embodiments, servers 102 and 104 serve as backup for each other for at least some of their streams. The system of FIG. 1 can be used to transport any type of redundant data streams, including but not limited to video data (such as digital SGI data, MPEG data), audio data, redundant market information (stock ticker), redundant MMPG world updates (massive multiplayer games), redundant telemetry, redundant multicast for software updates, and so on.

Streams may go down for any of a large number of reasons. A physical connection may have been severed. A logical or business connection may have failed. A satellite connection may have failed.

Figure 2:
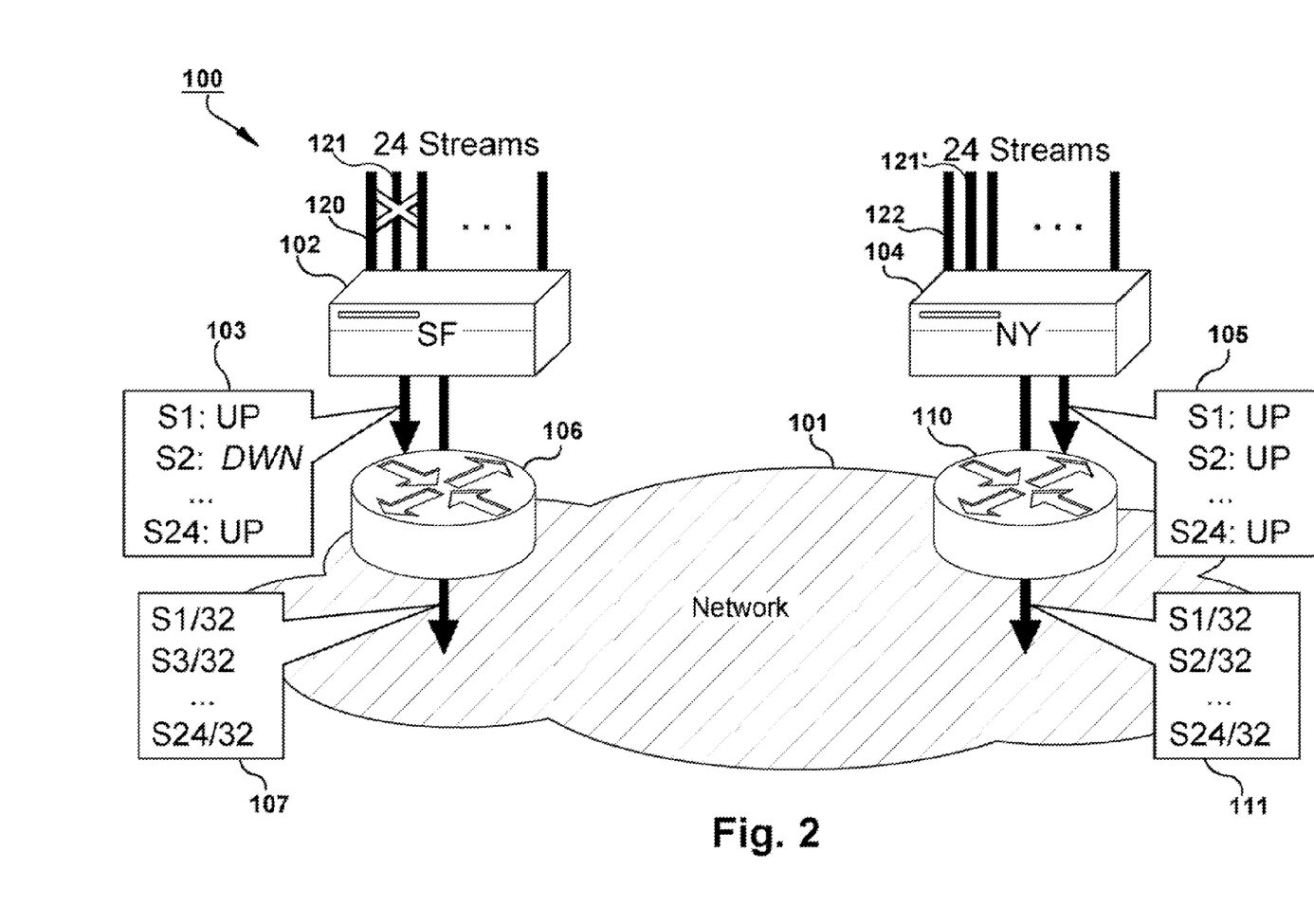
FIG. 2 is a block diagram in accordance with a preferred embodiment of the present invention when at least one stream is down.

FIG. 2 is a block diagram 100 in accordance with a preferred embodiment of the present invention when at least one stream is down at first server 102 and up at second server 104. In this example, stream 121, which is input to server 102, is down. Stream 121', which is input to server 104, is up. When server 102 detects that stream 121 is down, it sends status information 103 indicating that stream 121 (stream S2) is down but that all other streams sourced from server 102 are up. In accordance with the received information, router 106 changes the routing information 107 to remove itself from the route to stream S2 121 by withdrawing the host route to S2 121. The router information for stream 121' of router 104 does not change. Therefore, routing information in network 101 for stream S2 121 will quickly converge so that requests for stream S2 121 are routed to server 104 and not to server 102.

Figure 3A:
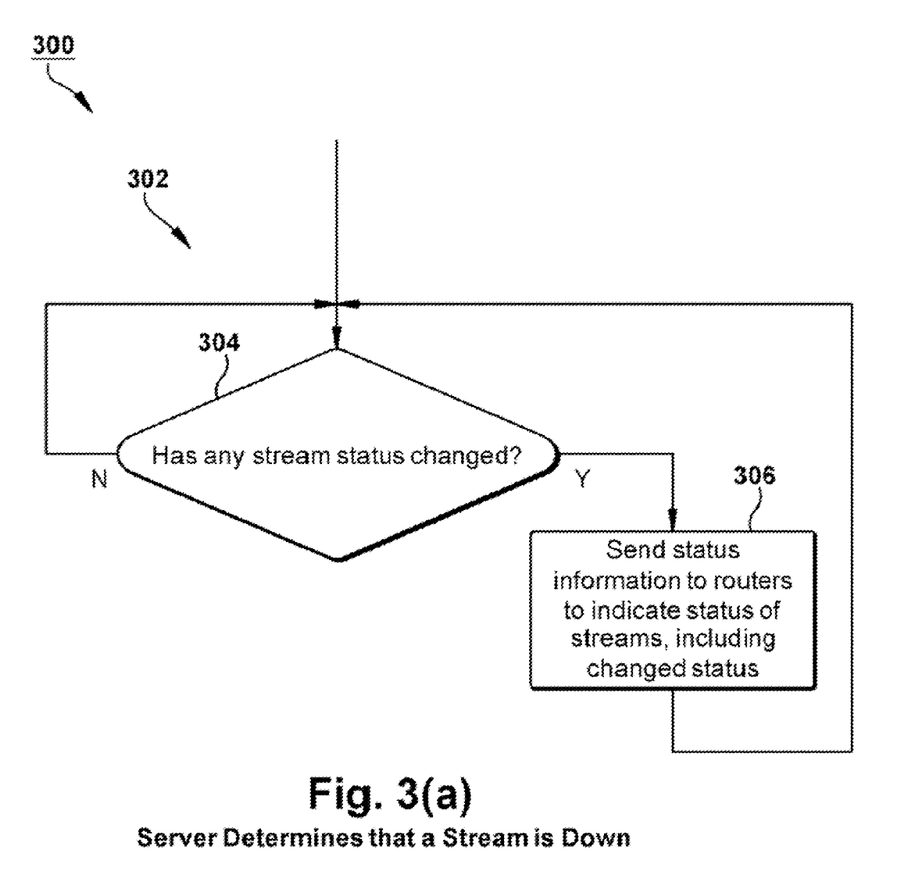
FIGS. 3(a) and 3(b) are flow charts performed by a server in accordance with a preferred embodiment of the present invention.
Figure 3B:
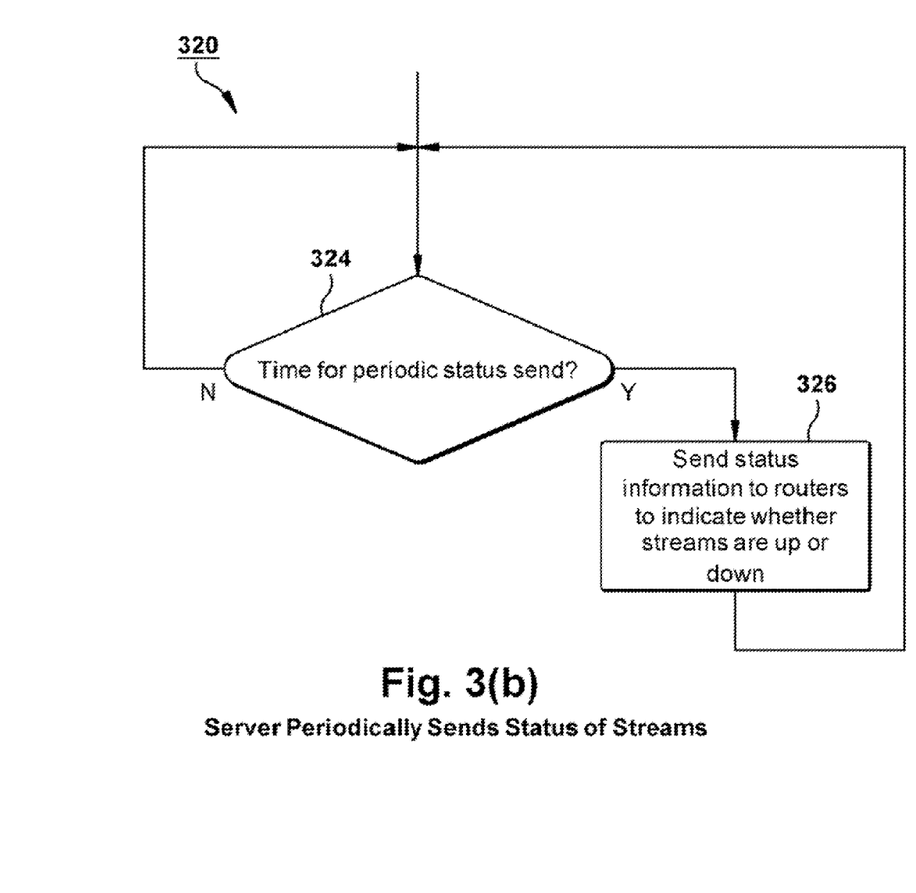

FIGS. 3(*a*) and 3(*b*) are flow charts of a method performed by a server in accordance with a preferred embodiment of the present invention. In the flowchart 300 of FIG. 3(*a*), when a stream is down 304, server 102, 104 sends 306 a status packet to the routers to so indicate. Server 102, 104 checks each of its streams in turn 302. In the flowchart 320 of FIG. 3(*b*), server 102, 104 periodically checks each of its streams to determine whether a status of the stream has changed. In FIG. 3(*b*), server 102, 104 periodically 324 sends the status of its streams to the routers 326. In a preferred embodiment, the periodicity is every 30 seconds.

Figure 3C:
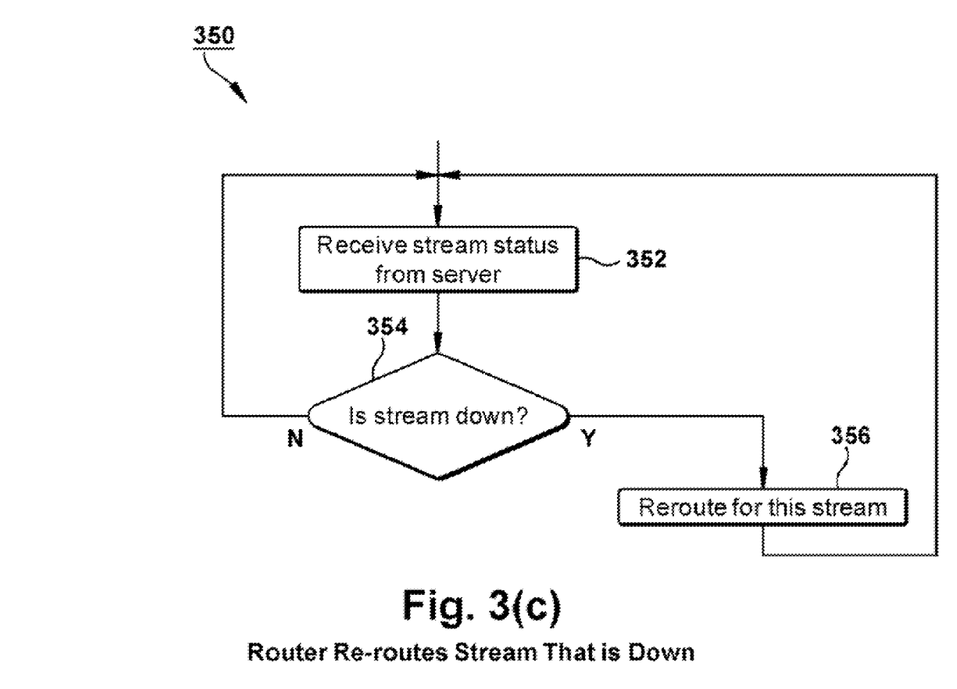
FIG. 3(c) is a flow chart performed by a server in accordance with a preferred embodiment of the present invention.

FIG. 3(*c*) is a flowchart 350 of a method performed by each of router 106, 110 in accordance with a preferred embodiment of the present invention. Router receives 352 a status for each stream from one of the servers (or NMS). If a stream is down 354, router 106, 110 communicates with other routers in network 101 to reroute requests 356 for the stream that is down away from the server having the down stream. In a preferred embodiment, this is done by having router 106 advertise routes for each stream in accordance with which stream at which server is up. (i.e., the router withdraws a host route from the IGP causing the network to converge to the remaining anycast server(s) in the network).

Figure 4:
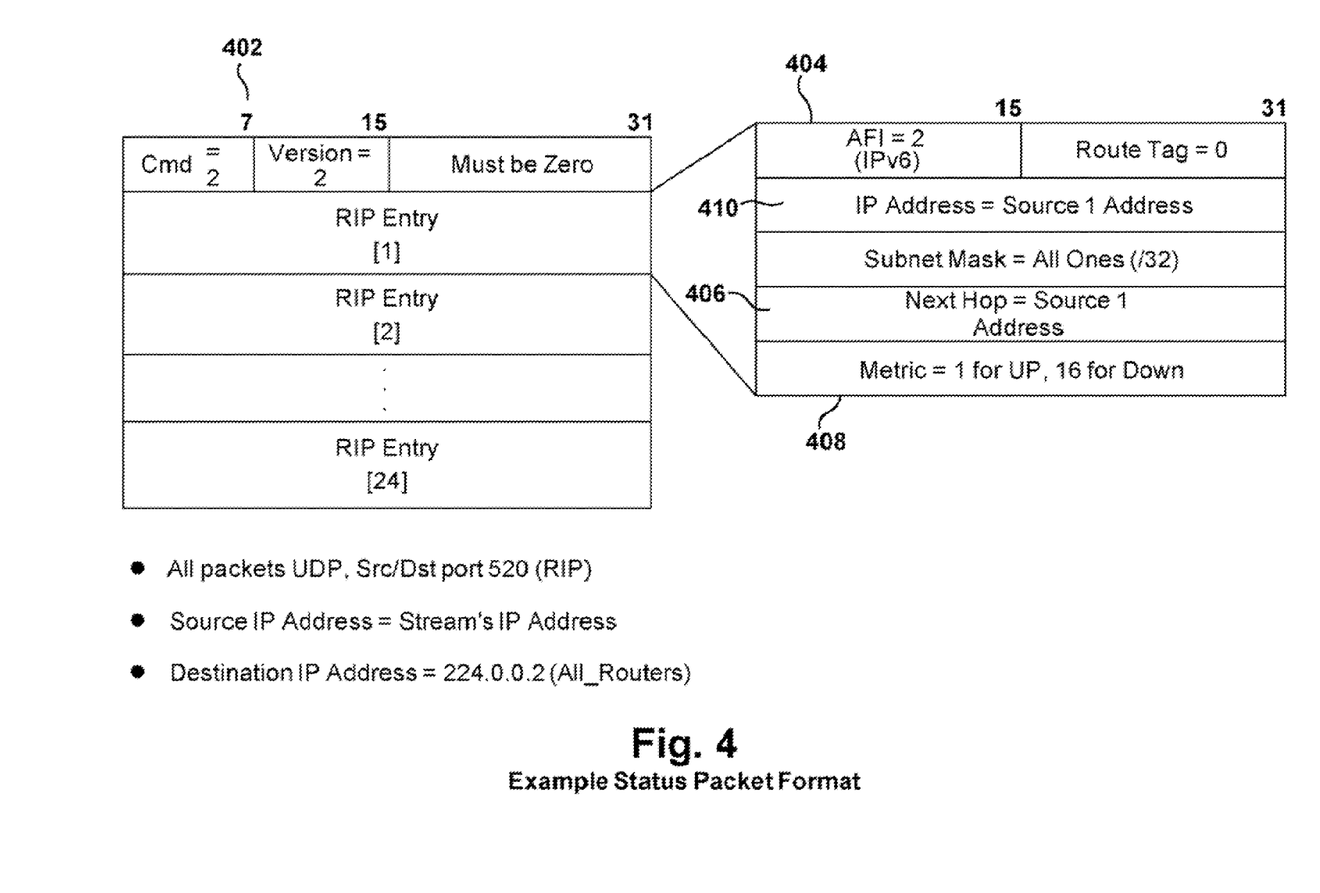
FIG. 4 shows a packet format in accordance with a preferred embodiment of the present invention.

FIG. 4 shows a packet format for the status information sent from a server (or NMS) in accordance with a preferred embodiment of the present invention. The status information acts as a signaling mechanism that allows a server to indicate which of its streams is up and which is down. In the described embodiment, a status packet contains the status of each stream. Other embodiments may contain statuses of a subset of the streams. In the described embodiment, the status packet is based on the RIPv2 Response packet, as described in RFC 2453, "RIP version 2," G. Malkin, 1998, which is incorporated herein in its entirety. RIP is an example of a distance-based protocol. Note that the described embodiment does not implement the entire RIP protocol, although other embodiments may do so.

Packet 402 contains a status 404 for each stream sent by a server (here RIP entries 1-24). Each status has a value of either "up" or "down" in field 408. Other embodiments may incorporate additional or other appropriate status values. In the described embodiment, a status of "up" is indicated by a value of "1" in field 408 and a status of "down" is indicated by a value of "16" in field 408. The next-hop address in field 406 may be fine-tuned by setting field 406 to have the same content as field 410 (IP source address announced).

In the example of FIGS. 1 and 2, a video server 102 is sourcing twenty-four streams as source IP addresses S1-S24 to one or more multicast groups. Recipients have joined these groups using, for example, a multicast Join message. Periodically (or when a status changes) the server constructs a standard RIPv2 response packet with twenty-four host routes, S1/32 through S24/32 with a metric of "1" in field 408. The status packet contains a separate source IP address 410 for each stream being sourced by a server.

The router receives the packet and is configured to distribute these RIPv2 host advertisements into a rapidly converging IGP route protocol (e.g., OSPF, EIGRP or ISIS protocols). If the server detects the loss (or recovery) of any of its data streams (e.g., loss of MPEG video in the case of a video anycast server), it will immediately trigger a new RIPv2 Response packet with the affected stream advertised with a metric of "infinity" (i.e., 16). This results in the router withdrawing this host route, causing the network to converge to the remaining anycast servers that source the stream that has gone down.

In a preferred embodiment, a newer version of network protocol (such as ISIS, EGRP, or OSPF) connects to a network running RIP at its boundary. In such as situation, RIP routing information indicating source status will need to be redistributed into the network's IGP. As understood by persons of ordinary skill in the art, the system can be configured to perform this function.

Figure 5:
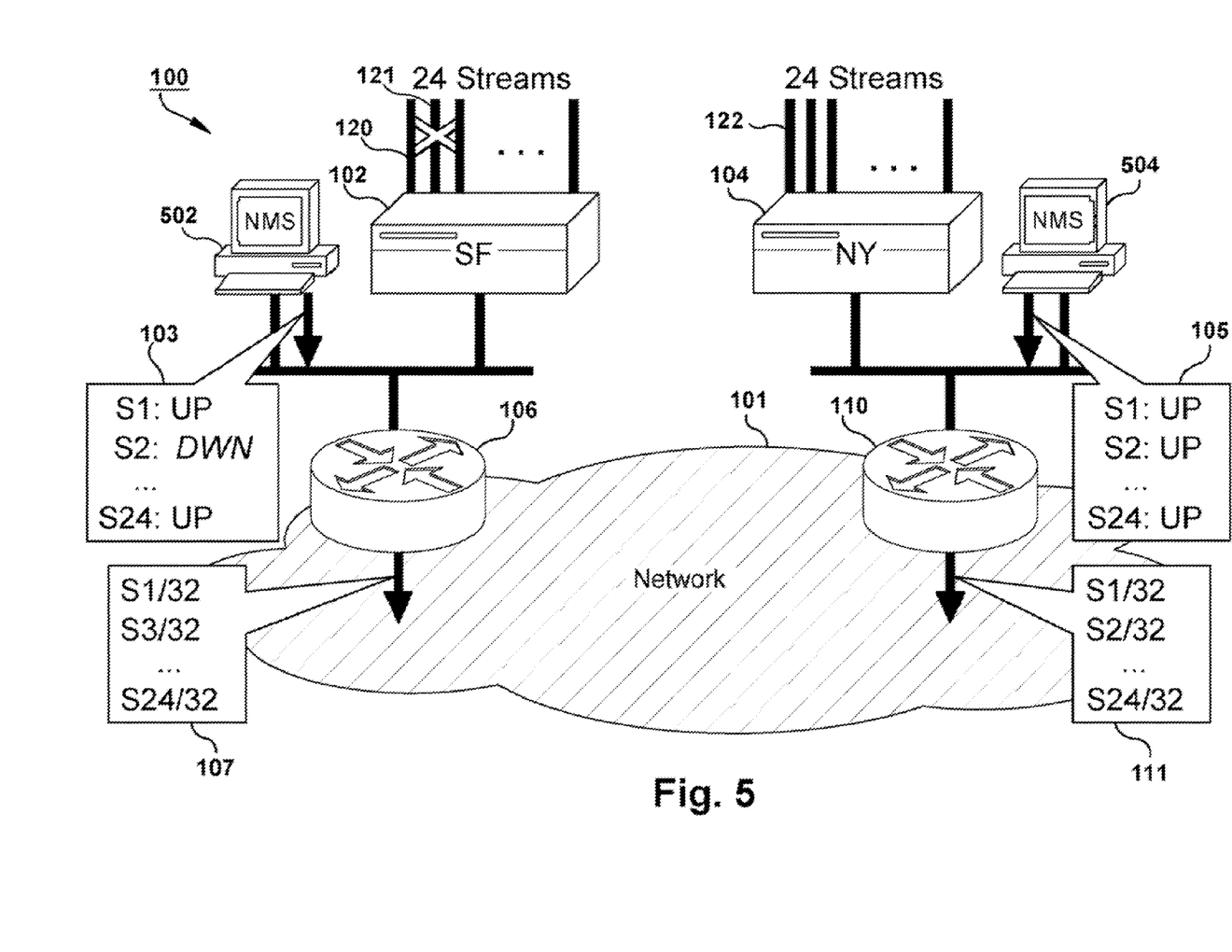
FIG. 5 is a block diagram in accordance with another preferred embodiment of the present invention when at least one stream is down.

FIG. 5 is a block diagram 500 in accordance with another preferred embodiment of the present invention when at least one stream is down. In this embodiment, third party network management stations (NMS) 502, 504 perform the status signaling based on out of band telemetry between the server and its network management station. In other words, when loss of a telemetry signal between NMS and its associated server is detected, the NMS indicates that a stream is down, as described above. The advantage of using an NMS is that it allows the introduction of the redundancy and fast failover offered by this invention without necessarily having to upgrade the actual servers sending the traffic. An NMS can detect streamer failure and send the down signal for all streams that were being transmitted by the streamer to the router. However, the use of a NMS can add latency to the detection and signaling of the loss of a single stream. Combinations of both streamer signaling and NMS signaling are possible.

In summary, sending status information sent from the server to its local router allows control to be implemented in the server (or third party manager).

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions are presented in terms of methods and symbolic representations of operations on data bits within a computer memory in a router and/or a source. These methodic descriptions and representations are the method used by those skilled in the data processing arts to most effectively convey the substance of their work to others skilled in the art. A method is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, and CD-ROMs, read-only memories (ROMs), random access memories (RAMs), EPROMs, EEPROMs, or any type of media suitable for storing electronic instructions, and each coupled to a computer system bus.

The methods and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. Thus, the present invention is capable of operating with any information system from those with minimal functionality to those providing all the functionality disclosed herein.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method, comprising:

receiving a plurality of multicast streams of data into a first router;

associating a separate source address with each of the received plurality of multicast streams;

sourcing the plurality of multicast streams of data with the associated addresses to an associated recipient;

determining whether each individual multicast stream belonging to the plurality of multicast streams of data is up or down;

periodically sending, independent of the plurality of streams a packet comprising status information, the status information comprising a status value for each individual stream belonging to the plurality of streams of data to the recipient indicating whether each of the plurality of streams of data is up or down;

continuously while receiving the plurality of multicast streams, detecting a loss or a recovery of a one of the plurality of multicast streams and, in accordance with a loss or recovery being detected, immediately sending a status packet to the associated recipient, the status packet including status change information indicating the detected loss or recovery of the one of the plurality of multicast streams of data and redirecting the one of the plurality of multicast streams data to a second router having at least one available stream in accordance with the status packet indicative of loss of the one of the plurality of multicast streams of data.

2. The method of claim 1, further comprising:

determining when one of the plurality of multicast streams of data is down; and in accordance with the determining, sending status information for each of the plurality of multicast streams of data to the recipient indicating that at least one of the plurality of multicast streams of data is down.

3. The method of claim 1, wherein the plurality of multicast streams of data are a plurality of streams of video data.

4. The method of claim 1, wherein the associated address is an IP source address.

5. The method of claim 1, wherein the status information includes a "1" value when one of the plurality of data streams is up.

6. The method of claim 1, wherein the status information includes an "infinity" value when one of the plurality of data streams is down.

7. The method of claim 1, wherein the recipient is a router.

8. The method of claim 1, wherein the recipient is an Internet router.

9. The method of claim 1, wherein the status information is sent using a RIP protocol.

10. The method according to claim 1, wherein the plurality of streams are received from a first source, the method further comprising re-routing requests for the one of the plurality of streams to a second source;
wherein the remaining of the plurality of streams are still received from the first source.

11. The method of claim 1, wherein sending status information is performed by a server.

12. The method of claim 1, wherein sending status information is performed by a network management station separate from a server that is sourcing the plurality of multicast streams of data.

13. The method of claim 1, wherein the status information is sent using a distance-based routing protocol.

14. A computer program product, having a non-transitory computer readable medium having instructions thereon capable of causing a data processing system to perform a method comprising:
receiving a plurality of multicast streams of data from a source, wherein each of the plurality of multicast streams is identified by an associated source address;
transmitting routing information for each of the plurality of multicast streams for transmission via an associated first router;
periodically receiving a packet having status information comprising a status value for each of the plurality of multicast streams of data from the source indicating whether each of the plurality of multicast streams of data is up or down;
updating the routing information for a stream of data responsive to receiving status information indicating a selected one multicast stream of data selected from the plurality of multicast streams is down;
withdrawing host routing information for a previously advertised host route for the selected one multicast stream;
wherein the packet is received independent of the plurality of streams; and
transmitting the selected one multicast stream via an associated second router in accordance with a packet having status information indicating that the selected one multicast stream is down.

15. A method, comprising:
receiving a plurality of multicast streams of data from a single source, wherein each individual multicast steam of the plurality of multicast streams is identified by an associated source address;
transmitting routing information with the associated address for each of the plurality of streams of data;
periodically receiving status information from a packet that is received independent of the plurality of multicast streams of data, the status information comprising a status value for each individual multicast stream of data of the plurality of streams of data from the source indicating whether each individual multicast stream of data belonging to the plurality of multicast streams of data associated with a first router is up or down;
updating the routing information corresponding to a second router as updated routing information for an individual stream of data belonging to the plurality of streams of data responsive to receiving status information indicating that the individual stream of data is down; and,
advertising the status information by selectively transmitting the updated routing information with the associated address for each of the plurality of streams of data other than the individual stream of data indicated as down such that the individual stream of data is reassociated with the second router.

16. The method of claim 15, further comprising:
wherein the method is performed by a router and, in accordance with receiving the status information indicating that a particular multicast stream of data is down, transmitting updated routing information to withdraw a previously advertised host route to the associated source address of the particular multicast stream of data.

17. The method of claim 15, wherein the plurality of multicast streams of data are a plurality of multicast streams of video data.

18. The method of claim 15, wherein associated source address is an IP source address.

19. The method of claim 15, wherein the status information includes a "1" value when one of the plurality of data streams is up.

20. The method of claim 15, wherein the status information includes an "infinity" value when one of the plurality of data streams is down.

21. The method of claim 15, wherein the method is performed by a router.

22. The method of claim 15, wherein the method is performed by an Internet router.

23. The method of claim 15, wherein the status information is sent using a RIP protocol.

24. The method of claim 15, status information is received from a network management station that is separate from a server that is sourcing the plurality of multicast streams of data.

25. The method of claim 15, wherein the status information is sent using a distance-based routing protocol.

26. A computer program product, having a non-transitory computer readable medium having instructions thereon capable of causing a data processing system to perform a method comprising:
receiving a plurality of multicast streams of data;
associating a separate source address with each individual multicast stream belonging to the plurality of multicast streams;
sourcing the plurality of multicast streams of data to a recipient via an associated first router;
determining whether each individual multicast stream of the plurality of multicast streams of data is up or down;
periodically sending a status packet independent of the plurality of streams containing status information, the status information comprising a status value for each individual multicast stream of the plurality of multicast streams of data to the recipient indicating whether each of the plurality of streams of data is up or down;
continuously while receiving the plurality of multicast streams of data, detecting by the server a loss or a recovery of a one of the plurality of multicast streams of data and immediately sending a response packet to the associated recipient, the response packet including status change information indicating the detected loss or recovery of the one of the plurality of multicast streams of data; and sourcing the one of the plurality of multicast streams via an associated second router in accordance with the response packet including status enrage change information indicating the detected loss thereof.

27. A system, comprising:

a module that receives a plurality of multicast streams of data;

a module, and a first router associated therewith, that associates source addresses with each of the plurality of multicast streams of data;

a module that sources the plurality of multicast streams of data to an associated recipient;

a module that determines whether each individual multicast stream of the plurality of multicast streams of data is up or down;

a module that periodically sends a packet comprising status information, the status information comprises a status value for each individual multicast stream of the plurality of multicast streams of data to the recipient indicating whether each individual multicast stream belonging to the plurality of multicast streams of data is up or down;

a module that continuously while receiving the plurality of streams of data, detects a loss or a recovery of a one of the plurality of multicast streams of data and immediately sends a status packet to the associated recipient, the status packet including multicast status change information indicating the detected loss or recovery of the one of the plurality of streams of data; and a redirector operative to redirect the one of the plurality of streams to a second router in accordance with the status packet.

28. The system of claim 27, further comprising:

a module that determines when one of the plurality of multicast streams of data is down; and a module that sends, in accordance with the determining, status information for each of the plurality of multicast streams of data to the recipient indicating that at least one of the plurality of multicast streams of data is down.

29. A system, comprising:

a module that receives a plurality of multicast streams of data from a single source, wherein each of the plurality of streams is identified by an associated source address;

a module that transmits host routing information for each of the plurality of multicast streams of data to a first router, the routing information including the associated source addresses;

a module that periodically receives status information independent of the plurality of multicast streams of data, the status information including a status value for each individual multicast stream of data belonging to the plurality of multicast streams of data from the source indicating whether each of the plurality of multicast streams of data is up or down;

a module that updates the routing information and withdraws host routing information for an individual multicast stream belonging to the plurality of multicast streams of data responsive to receiving status information indicating the individual multicast stream belonging to the plurality of multicast streams of data is down; and selectively transmitting the updated routing information with the associated address for each of the plurality of multicast streams of data other than the individual multicast stream of data indicated as down such that the individual multicast stream is reassociated to a second router for transmission of the individual multicast stream.

30. The system of claim 29, further comprising:

wherein the system is a router further comprising a module that sends, in accordance with receiving the status information indicating that a particular stream of data is down, updated routing information to remove a host route to the associated source address of the particular stream of data.

31. An apparatus, comprising:

means for receiving a plurality of multicast streams of data;

means for associating a separate source address with each individual multicast stream belonging to the received plurality of multicast streams of data and sourcing the plurality of multicast streams of data to an associated recipient via an associated first router;

means for determining whether each individual multicast stream belonging to the plurality of multicast streams of data is up or down;

means for periodically sending a status packet independent of the plurality of streams containing status information, the status information comprising a status value for each individual multicast stream belonging to the plurality of multicast streams of data to the recipient indicating for each individual stream whether the individual stream is up or down; and, means for detecting a loss of a selected one of the plurality of multicast streams; and means for sending a status packet to the associated recipient, the status packet containing status change information indicating the detected loss of the selected one of the plurality of multicast streams; and means for redirecting the selected one of the plurality of multicast streams to a second router in accordance with the status packet.

32. An apparatus, comprising:

means for receiving a plurality of multicast streams of data from a source, wherein each individual stream belonging to the plurality of multicast streams is identified by an associated source address;

means for transmitting routing information for each individual multicast stream belonging to the plurality of streams to a first router;

means for periodically receiving status information from a packet independent of the plurality of multicast streams, the status information comprising a status value for each individual multicast stream belonging to the plurality of multicast streams of data from the source indicating for each individual multicast stream whether the individual stream is up or down;

means for withdrawing a previously advertised host route for a selected individual multicast stream belonging to the plurality of multicast streams responsive to receiving status information indicating the stream selected individual multicast stream is down; and means for associating at least one individual stream that is down to a second router in accordance with the status information indicating that the at least one individual stream is down.

* * * * *